Figure 1:
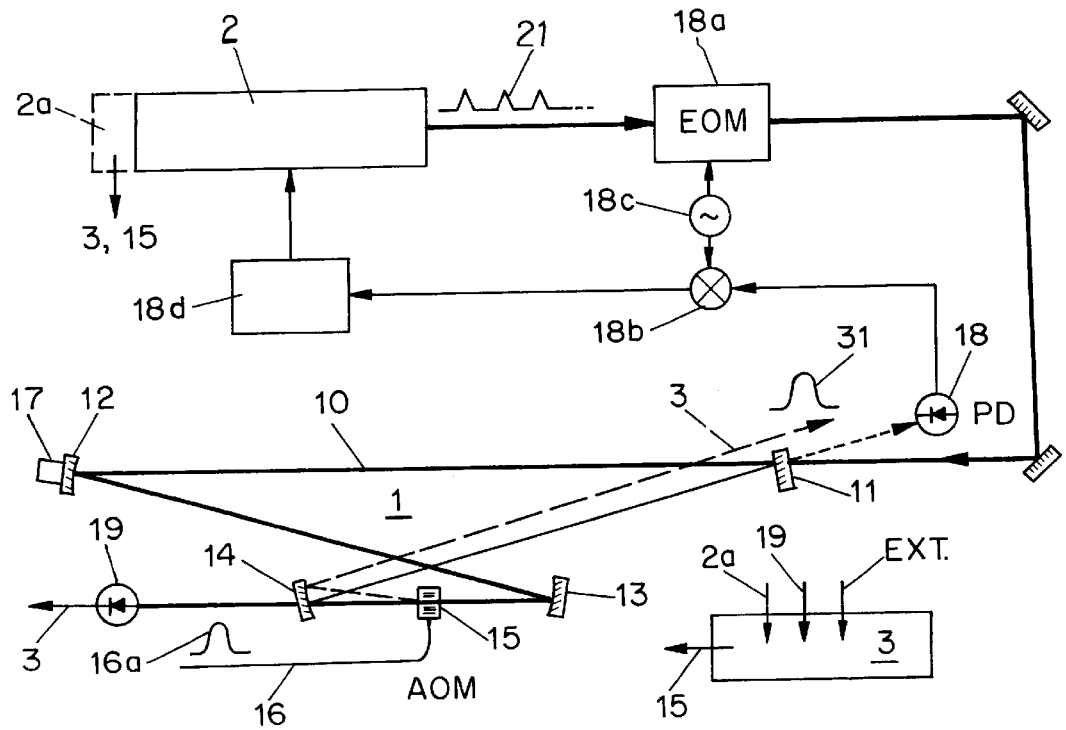

United States Patent [19]
Hänsch et al.

[11] Patent Number: 6,038,055
[45] Date of Patent: Mar. 14, 2000

[54] METHOD AND DEVICE FOR GENERATING PHASE-COHERENT LIGHT PULSES

[75] Inventors: Theodor Hänsch; Tilman Heupel, both of München; Martin Weitz, Haimhausen, all of Germany

[73] Assignee: Max-Planck-Gesellschaft zur Forderung der Wissenschaften e.V., Munich, Germany

[21] Appl. No.: 09/190,832

[22] Filed: Nov. 12, 1998

[30] Foreign Application Priority Data

Nov. 13, 1997 [DE] Germany .................. 197 50 320

[51] Int. Cl.⁷ ..................................................... G02F 1/01
[52] U.S. Cl. ..................... 359/279; 359/264; 372/25; 372/28; 372/32; 372/18
[58] Field of Search .................................. 359/264, 279, 359/305; 372/18, 25, 28, 30, 32

[56] References Cited

U.S. PATENT DOCUMENTS

| | | | |
|---|---|---|---|
| 4,827,480 | 5/1989 | Kowalski | 372/28 |
| 4,998,254 | 3/1991 | Negus | 372/18 |
| 4,999,840 | 3/1991 | Negus | 372/18 |
| 5,003,545 | 3/1991 | Kowalski | 372/25 |
| 5,150,248 | 9/1992 | Alfano et al. | 359/264 |
| 5,305,334 | 4/1994 | Margalit et al. | 372/32 |
| 5,347,392 | 9/1994 | Chen et al. | 359/279 |

OTHER PUBLICATIONS

"Generation of 13–fs, 5–MW pulses from a cavity–dumped Ti:sapphire laser" by Pshenichnikov et al.; Optics Letters/vol.19, No. 8/Apr. 15, 1994, pp. 572–574.

"Verhandlungen" der Deutschen Physikalischen Gesellschaft; ISSN 0420–0195, Frühjahrstagung Mainz 1997; p. 348.

*Primary Examiner*—Loha Ben
*Attorney, Agent, or Firm*—Baker & Botts, L.L.P.

[57] ABSTRACT

For the generation of amplified, phase-coherent light pulses, a sequence of phase-coherent, equidistant input light pulses (21) is coupled into a resonator device (1) with at least two resonator mirrors (11, 14), forming a light path (10) with a predetermined resonator length, in such a way that the coupled in input light pulses in the resonator device are linearly superimposed in succession to form at least one circulating light pulse, whereby the circulating light pulse is coupled out of the resonator device as an output light pulse (31) as soon as the circulating light pulse has reached a preset minimum level of energy.

15 Claims, 1 Drawing Sheet

METHOD AND DEVICE FOR GENERATING PHASE-COHERENT LIGHT PULSES

The invention concerns a method for generating phase-coherent light pulses, in particular a method for resonant amplification of light pulse sequences from laser light sources. The invention concerns furthermore a device for implementing a method of this kind.

It is generally known that the energy of pulsed laser light can be increased by socalled regenerative amplifiers. In a regenerative amplifier a light pulse that is to be amplified is used to trigger stimulated emission in an amplification medium with a generated population inversion. The disadvantage of regenerative amplifiers results from the fact that an active amplification medium must be present in the amplifier. Furthermore, a separate pump laser is necessary to generate the density inversion. This means that regenerative amplifier arrangements involve considerable outlay in terms of cost, energy and material plus a substantial adjustment effort.

It is also known that laser pulses can be obtained by using resonator modulators. In the socalled cavity dumping method (hereafter referred to as "cd method"), there is a socalled cavity dumper in the laser resonator, e.g. in the form of an acousto-optical modulator. In a mode-coupled laser with pulse operation, the modulator, in an initial state, firstly allows multiple passing of a light pulse through the resonator with the amplification medium until sufficiently high pulse energy is achieved through the amplification each time, after which, in a second state of the modulator, the pulse is deflected or coupled out of the resonator.

Figure 2:
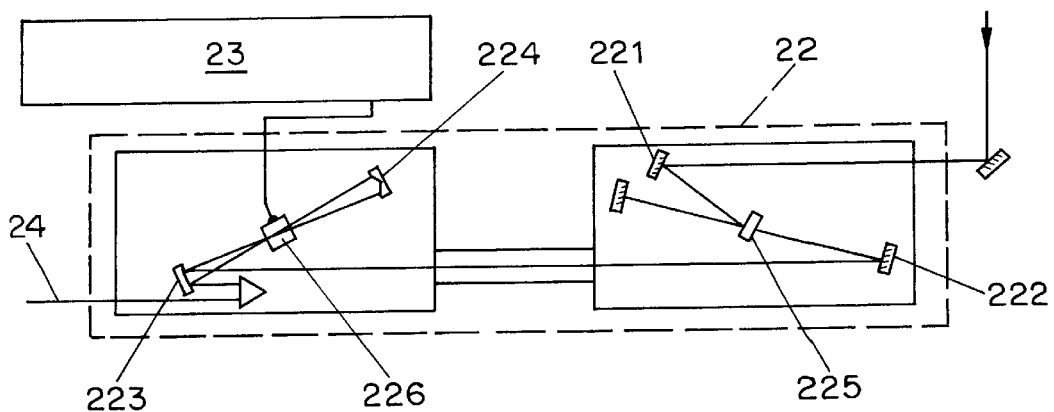

FIG. 2 is a schematic view of the major components of a cd arrangement, as described for example in the publication by M. S. Pshenichnikov et al. in "Optics Letters" (volume 19, 1994, p 572). A pump laser excites the pulse laser 22, comprising the resonator mirrors 221 through 224, an active medium 225 and an acousto-optical modulator 226 as the cavity dumper. The modulator 226 is driven by a control circuit 23, which additionally ensures synchronous operation with the circulating light pulse. The pulse laser 22, as in the previously mentioned publication for example, can be a Ti-sapphire laser, or a dye laser. The laser pulse circulating in resonator 221 through 224 of the pulse laser 22 is amplified twice every time it is applied to the pumped laser medium 225 until the modulator 226 couples it out to the outer light path 24. In addition to these basic components, the above mentioned publication speaks of providing means to compensate for dispersion in the resonator.

Pulse amplification by a cd arrangement as in FIG. 2 exhibits the following disadvantages. A pulse laser with a cavity dumper in the active laser resonator is a complicated structure. Generating laser pulses with sufficiently reproducible timing and the spectral characteristics required for a given measurement application involves a large amount of adjustment. A further and decisive disadvantage is the fact that only relatively small amplification factors can be achieved by the cd method. Thus, with the Ti-sapphire laser with cavity dumper according to M. S. Pshenichnikov et al., the pulse energy is increased by a factor of 10. This degree of amplification is inadequate for numerous applications in measurement engineering, and especially for producing nonlinear, optical effects.

Generally speaking then, the generation of amplified laser pulses involves a large amount of apparatus. There is considerable interest in laser pulse sources with high output power and expanded application possibilities for the observation of fast physical processes, for example in physical chemistry and solid-state physics.

The object of the invention is to propose a simplified method of generating intensive, phase-coherent light pulses with levels of pulse energy that were previously only obtained by elaborate, regenerative amplifiers, whereby the light pulses are to exhibit reproducible timing and spectral characteristics. It is also the object of the invention to propose a device for implementing the method, in particular a pulse amplifier for phase-coherent light pulses that is considerably simpler in structure than conventional amplifier arrangements.

These purposes are solved by a method and a device with the features of the appended claims.

The invention is based on the idea of amplifying pulses by a passive resonator in such a way that the resonator is first charged (or: loaded) with a sequence of phase-coherent input light pulses with predetermined pulse spacing (equidistant in time) and then discharged after achieving sufficiently high resonator energy by means of a fast optical switch, for example an acousto-optical modulator. The optical resonator length is attuned to the spacing of the input pulses in time so that, after coupling in a first input pulse, each input pulse that is newly coupled in can be superimposed linearly with a light pulse circulating in the resonator. The charging of the resonator, i.e. the coupling-in of the input pulses, is performed using a resonator mirror acting as an input coupling mirror so that a circulating light pulse in the resonator and an incident input pulse are timed to coincide with a time overlap on the input coupling mirror and continue to circulate in the resonator as one, superimposed and amplified pulse. As a result of the coupling in of input pulses synchronous to the circulation of the light pulse in the resonator, the energy of the circulating light pulse is increased with each successive input pulse without any amplification medium in the resonator. The increase of optical power in the resonator continues until each further input pulse that is to be superimposed is just compensated by the relative losses in the resonator.

The resonator is discharged by a modulator as known from the cd method. As soon as the energy of the light pulse(s) circulating in the resonator is high enough, a modulator is driven so that an amplified light pulse is output by the resonator.

A device for implementing the method according to the invention comprises in particular a light resonator with at least two resonator mirrors that form a light path with a resonator length attuned to the repetition frequency of the input pulses. The device according to the invention also includes a modulator that, in a first operating state, allows resonant circulation of light pulses in the resonator and, in a second operating state, deflects a circulating light pulse out of the resonator.

The invention exhibits the following advantages. For the first time it is possible to generate phase-coherent light pulses of high energy in the $\mu J$ range (and higher) and without requiring the large outlay of a regenerative amplifier apparatus. In particular, the use of an amplification medium and an extra pump laser is avoided. The resonator arrangement for pulse amplification, depending on the quality of the optical components used in the resonator, allows an increase in optical power by gain of approx. 100 to 1000 referred to the input light pulses. Amplification is produced without an amplification medium, because the light path in a resonator according to the invention is free of an amplification medium. In this way, it is possible to leave the spectral and timing characteristics of the coupled-in light largely unaltered when it is circulating. The invention is suitable for any pulse widths from the ns to the fs range. The amplified output pulses exhibit excellent spectral characteristics at high power. A special advantage of the invention is the fact that a resonator is proposed as a versatile, separate component of an optical setup, forming a separate, passive system independent of the active laser. Compared to the conventional cd method, a particular advantage of the application according to the invention is the structure of an external resonator free of media. The resonator of the invention is largely free of absorption. There are only single elements introducing slight dispersion in the light path. This reduces high refractive indexes and thus the disadvantageous dispersion effects of conventional cd methods.

There are applications that will benefit from the invention in atomic optics and in all fields of measurement of ultrashort processes in spectroscopy. One important technical application is in precise spot welding for example, where high pulse power is required. In some microstructural applications, on the other hand, the laser pulse energy must not be high in order to avoid thermal damage to the surrounding material, so the use of ultrashort, intensive light pulses is an advantage.

Further details and advantages of the invention are illustrated in the following description of the attached drawings showing:

FIG. 1: a schematic view of an optical arrangement according to the invention; and FIG. 2: a schematic view of a conventional pulse laser with cavity dumper (state of the art).

The optical arrangement of the schematic view in FIG. 1 shows a resonator 1 according to the invention combined with a pulse laser 2 to provide a train or a sequence of short-duration light pulses equidistant in time. The resonator 1 consists of a group of resonator mirrors 11 through 14 (e.g. dielectric broadband mirrors) that, in the numbered order 11-12-13-14-11, form a closed light path 10 with an adjustable optical resonator length or circulation length L. The first resonator mirror 11 forms an input coupling mirror, provided to couple in the pulse sequence or input pulses 21 that are to be amplified into the resonator 1. In the embodiment shown here, the input coupling mirror is a partially transmitting mirror that is passed by the input pulses 21 in one direction corresponding to the alignment of the light path 10 within the resonator 1.

To achieve maximum pulse power, the transmission of the input coupling mirror is best selected so that it corresponds to the optical losses along the light path during one resonator circulation (modulator element in first operating state, see below). In this case the increase in optical power in the resonator corresponds approximately to the inverse of the transmission of the input coupling mirror. If optical losses are low enough, the resonator produces an extraordinarily high increase. It is best to use dielectric mirrors with relative losses of 1 to 10 millionths (1–10 ppm), socalled super mirrors. Furthermore, the relative losses of a commercial, acousto-optical modulator cut at the Brewster angle can be less than 0.1%. Finally, optical glass or quartz surfaces arranged at the Brewster angle, eg optical, internal resonator elements for dispersion compensation or elements for extracting the light pulses, exhibit scattering losses of the order of a few ppm per surface after suitable polishing.

The pulse laser 2 may be any laser suitable for producing ultrashort light pulses, for example a solid-state laser like Ti-sapphire, a gas laser like an inert gas ion laser, a dye laser or a diode laser.

The light path 10 in the resonator 1 is free of laser media and free of absorption as much as technically possible. The resonator 1 is thus constructed so that light pulses circulating along the light path 10 are able to travel independently of laser media and largely free of interaction. The only optical element in the light path 10, but not an amplifying medium, is a modulator element 15, which can be driven via an electrical terminal 16. The light path 10 is formed either by the surrounding air or an appropriate inert surrounding medium or by the modulator element 15.

The modulator element 15 is an acousto-optical modulator (AOM). For the AOM it is possible to use a modulator component of the kind known from the cd methods and available from "Harris" (USA) or "Gooch & Housego" (UK) for example. The AOM can be cut at the Brewster angle or provided with an anti-reflection coating to achieve low transit losses.

FIG. 1 also shows a device for stabilizing wavelength. Wavelength stabilization is provided to attune the input pulses and the resonator to one another so that phase matching is produced between the input pulses and the light pulses circulating in the resonator. For this purpose the resonator length of the pulse laser 2 and/or the resonator length of the pulse amplifier 1 is set by a setting device 18d using an error signal as described below.

In the illustrated example, the error or control signal for the setting device 18d is generated by a sideband method known from radiofrequency engineering (cf Drever et al. in "Appl. Phys. B", volume 31, 1983, p 97). The input pulses from the pulse laser 2 are applied to an electro-optical modulator (EOM) 18a before they are coupled into the resonator 1. Through the effect of an electric field fed in from a radiofrequency source 18c, the refractive index alters periodically and thus the optical wavelength in the EOM. This modulation produces a periodic variation of the instantaneous frequency of every single component of the mode spectrum of the input light pulses. In the frequency domain this corresponds to the additional appearance of two frequency sidebands that are arranged antisymmetrically about each of the original components of the mode spectrum of the pulse laser 2 at the interval of the modulation frequency on the EOM.

The modulated input pulses strike the input coupling mirror (resonator mirror 11), where a fraction of the input pulses corresponding to the sidebands and, in the absence of tuning between the input pulses and the resonator 1, another fraction of the input pulses corresponding to the center frequency is reflected to a detector device 18 (eg photodiode). The detector device 18 is connected to a phase detector 18b. The detector signal is demodulated on the phase detector 18b with the EOM's modulation frequency. The phase detector 18b delivers the control signal, which exhibits a passage through zero for optimum wavelength tuning, to the setting device 18d.

In an alternative implementation of the resonator with two mirrors (see below), in which the input pulses strike the input coupling mirror at a right angle, reflected light is deflected to the detector device 18 by a polarization beam splitter cube and a $\lambda/4$ lamella in front of the input coupling mirror for example.

If the tuning of the laser frequency to the resonator mode structure is not optimum, components in the pulse laser 2 or in the resonator 1 are corrected by the setting device 18d. In the pulse laser 2 this is best done by a piezo setting device on the laser resonator mirrors and possibly an additional electro-optical modulator. Correction in the resonator is performed by the adjusting device 17 (see below). Only very small path length alterations of less than an optical wavelength (some hundred nm) are necessary to set the right laser frequency or resonator mode structure.

Alternative ways of generating error or control signals for wavelength stabilization are the socalled side-off-fringe method, where stabilization refers to a fringe of the mode structure, the method according to Hansch-Couillaud, involving polarization analysis, or the dither-lock method, in which either the laser frequency or the resonator length is slightly altered periodically and thus the resonance condition of the resonator is detected referred to the wavelength that is to be coupled in.

FIG. 1 shows further components of the resonator arrangement, which are not essential in all applications of the invention however. Thus there is an adjusting device 17 on one of the resonator mirrors, for example, for altering the circulation length L of the resonator 1. In the example shown the adjusting device 17, which can be a combination of a mechanical (eg micrometer) and a piezoelectric controlling element for instance, is attached to resonator mirror 12. But attachment to one of the other resonator mirrors is also possible, whereby, for reasons of stability, it is preferable to choose a resonator mirror for adjustment from which the light path 10 does not lead direct to the modulator element 15. The resonator device 1 is best constructed so that the light path 10 on the adjustable resonator mirror follows as acute as possible a reflection angle (virtually right-angle incidence) to avoid maladjustment of the resonator if the resonator length L is altered. The attachment of an adjusting device 17 can be omitted if tuning between the resonator length L and the pulse spacing or the pulse repetition rate of the input pulses 21 is not to be made by mechanical adjustment of the resonator device 1 but by alteration of the pulse spacing of the input pulses 21 through influencing the pulse laser 2. In this case fine tuning of the wavelength must also be made by components in the laser resonator.

FIG. 1 also shows a detector device 19 that is provided for determining the energy of light pulses circulating in the resonator device 1. For this purpose one of the resonator mirrors is semi-transparent so that part of the circulating light pulse is coupled out of the resonator device 1 to the detector device 19.

The detector device 19 can be a fast responding photodiode, for example, that is connected to a controlling device 3. The detector device 19 is adapted to monitor the energy of the light pulses circulating in the resonator device 1 and to detect when a preset minimum energy level is exceeded, after which a circulating light pulse is to be coupled out of the resonator device 1. The use of the detector device 19 can be omitted for the event that another mechanism, not based on measurement of energy, is employed to trigger the coupling of light pulses out of the resonator device 1 with the aid of the modulator element 15. A pulse counting device 2a can be provided on the pulse laser 2, for example, that counts the pulses coupled into the resonator device 1 and issues an actuating signal for the modulator element 15 as soon as or after a preset number of pulses is exceeded. Alternatively, it is possible to control the modulator element 15 by an external signal "Ext" via the controlling device 3.

The method of the invention is implemented with an arrangement according to FIG. 1 such that the input pulses 21 (apart from the first input pulse when operation starts) are coupled into the resonator device 1 synchronous to the incidence of at least one circulating light pulse on the input coupling mirror. Synchronous input coupling means that each input pulse 21 is superimposed linearly with a circulating light pulse so that the power of the circulating light pulse(s) in the resonator device 1 is increased step by step. Synchronous input coupling is achieved in that the quotient of optical resonator length L and velocity of light corresponds as precisely as possible with the pulse spacing of the input pulses, a natural multiple or integral parts of it. Fulfillment of this condition can be checked by an autocorrelator, for example, attached for adjustment instead of the detector device 19. The resonator length is preferably set to produce a minimum pulse duration (or maximum pulse energy) of the light pulses appearing at this point, because this corresponds to synchronous input coupling. Alternatively, pulse analysis is also possible by examining the output pulses 31.

If the quotient corresponds to the simple pulse spacing, a light pulse is formed during operation that amplifies with every circulation in the resonator device. If the quotient corresponds to half the pulse spacing for example, a pulse is only amplified at every second circulation through the resonator. If the quotient corresponds to double the pulse spacing on the other hand, two circulating light pulses are formed, which superimpose by turns with new input pulses and are amplified. It is also possible to produce larger numbers of circulating light pulses in the resonator device 1, in which case special arrangements are necessary, described below, when coupling out single light pulses. Although the light path 10 is free of amplification media, there are still light losses during circulation due to non-ideal reflectivity of the resonator mirrors and the limited transmission of the modulator element 15. The result is a loss of energy per circulation on each circulating light pulse that represents a certain fraction referred to the overall energy of the light pulse. As soon as the circulating optical power as a result of the increase in pulse energy through synchronous superimposing with input light pulses is so high that the said fraction itself corresponds to the energy of an input light pulse, no further pulse amplification is possible. As soon as the maximum energy or a lower, desired level of energy of the circulating light pulse is obtained, the light pulse is coupled out as follows.

The acousto-optical modulator (AOM) exhibits a first operating state during the circulating and amplifying phase in which the light path 10 passes through the AOM for the most part without being influenced. When a light pulse is to be coupled out as an output light pulse 31, the AOM is switched to a second operating state in which the light path 10 (continuous line) is changed into an output light path 3 (dashed line). The second operating state is produced by applying a sound field to the AOM, as a result of which the circulating light is diffracted out of the light path 10. The temporary transition to the second operating state is produced by a pulsed switching signal 16a from the controlling device 3. The AOM is operated at a frequency of 395 MHz for example.

Initially the resonator device 1 works in the first operating state of the AOM until the circulating light pulse has reached a preset energy threshold (eg maximum energy). As soon as this energy threshold has been reached, the switching signal 16a is produced to deflect the output pulse 31 out of the resonator device 1. The timing of the switching signal 16a is selected by the controlling device so that a circulating light pulse is not disturbed. The switching signal 16a is applied to the AOM with a lead time ahead of the expected incidence of the light pulse that is to be coupled out. This lead time corresponds at least to the switching time of the AOM, which can be in the ns region. Thus it is possible, for example, to apply the switching signal 16a to the AOM immediately after a modulator pass of the circulating light pulse so that it can be deflected as an output pulse 31 upon incidence after a further circulation. After the coupling out of an output pulse 31, renewed buildup of a circulating light pulse and/or further coupling out of circulating light pulses is possible. Output pulse repetition frequencies up into the region of 100 kHz can be achieved and, with less increase in optical power, also into the MHz region.

In the implementation of a resonator device 1 according to the invention, it is advantageous to observe the following features. The circulating length L of the resonator must be set with an accuracy that is better than the geometric extension of the light pulses to be amplified so that adequate overlapping of the pulses spatially and in time is produced. For example, given the fact that a light pulse with a pulse length of 10 fs exhibits a geometric extension of approx. 3 $\mu$m, the setting accuracy and stability must be $10^{-6}$ (or better) for a resonator length L of 2.5 m. The requirements are correspondingly less for applications with ps or ns pulses.

It should also be noted that ultrashort laser light pulses have a finite spectral width. Thus, for example, a 10 fs pulse has a spectral bandwidth of 60 nm at 800 nm. Although the dispersion in the resonator device is much less than in conventional cd methods because of the omission of an amplification medium, compensation of dispersion can also be provided in the resonator device of the invention to prevent the pulses circulating in the resonator device from drifting apart with time. Otherwise pulses coupled in later would not overlap precisely with circulating light pulses, which would be of disadvantage for pulse amplification and the spectral and timing characteristics of the output pulses. The major contribution to dispersion comes from the modulator element, consisting, for example, of a thin quartz glass plate. To compensate for dispersion, suitable compensating devices are used that influence the light pulses in such a way that dispersion effects on the individual wavelength components within the light pulses are just canceled. A prism pair can be used as a compensating device. A prism pair for dispersion compensation in the cd method is described in the above mentioned publication by M. S. Pshenichnikov et al. for instance. The prism pair is best composed of highly polished prisms in which both the entering and the exiting angle are chosen close to the Brewster angle. The prism pair is arranged in an arm of the resonator device so that the prisms referred to the light path are opposite one another with their vertical angles.

It is possible for the compensating device to be formed by the resonator mirrors themselves if these are mirrors with depth of light penetration that is a function of wavelength (socalled chirped mirrors). Thus extra optical elements in the light path can be dispensed with. To achieve a sufficiently short response time of the modulator element, there is also interest in choosing the focus of the light path in the AOM as small as possible. Likewise of interest is as small as possible a ray size in order to obtain large divergence of the Gaussian beam. This is of advantage because the AOM diffracts the frequency components of the circulating light pulse formed by mode mixing from the light path in different directions. The full angular range is given by the ratio of the spectral bandwidth to the central wavelength. If the focus in the AOM is made so small that the divergence of the Gaussian beam is much greater than the full angular range of the scattered light, the mentioned effect for the individual frequency components is negligible. The mentioned angular range, taking 10 fs pulses as an example (spectral bandwidth 60 nm, central wavelength 800 nm), is about 3 mrad, resulting asymptotically in a divergence of about 26 mrad for beam diameter of about 40 $\mu$m.

An arrangement as in FIG. 1 can also include measures to compensate for astigmatism. For this purpose the curved resonator mirrors should be struck at an angle suitable for compensation.

Different to the illustrated embodiment, it is possible to use a non-crossed resonator or, instead of the four dielectric broadband resonator mirrors (or chirped mirrors), a smaller number of mirrors. A resonator device according to the invention, for example, can be composed of only two resonator mirrors with light pulses passing back and forth and a modulator element arranged between the resonator mirrors. Other resonator geometries are also possible, in which the light path must be free of amplification media however. Also possible is a resonator structure with several modulator elements arranged to couple out the output light pulses in different directions. This is a particular advantage if the resonator is implemented as an external modular amplifier.

The resonator device according to the invention is of special advantage where ultrashort light pulses of high energy and repetition rate are necessary. In particular, it is possible to couple fs light pulses of a mode-coupled laser (energy in the nJ region) into the resonator device, to produce typical amplification by a factor of 1000, and to couple out as a linear superposition in a single, intensive, ultrashort light pulse (energy of $\mu$J or several $10^7$ W of pulse power). Thus, with a relatively simple configuration, levels of gain are produced that to date were only possible with a regenerative amplifier and using additional amplification media and a pump laser. Compared to these active systems, better spectral quality of the laser pulses can also be achieved.

Another subject matter of the invention is the provision of an fs light source consisting of a pulse laser and a resonator device (combination according to FIG. 1).

We claim:

1. Method for generating phase-coherent light pulses in which a sequence of phase-coherent, equidistant input light pulses is coupled into a resonator device with at least two resonator mirrors, forming a light path with a predetermined resonator length, in such a way that the coupled-in input light pulses in the resonator device are linearly superimposed in succession to form at least one circulating light pulse, whereby the circulating light pulse is coupled out of the resonator device as an output light pulse after the circulating light pulse has reached a preset minimum level of energy.

2. Method according to claim 1 in which the output light pulse is coupled out by a modulator element with which the output light pulse can be deflected from the light resonator.

3. Method according to claim 2 in which the modulator element is actuated for output coupling after a detector device has determined that the circulating light pulse has reached the preset minimum level of energy.

4. Method according to claim 2 in which the modulator element is actuated for output coupling after a preset number of input pulses has been coupled into the resonator device.

5. Method according to claim 1 in which n circulating light pulses (n=natural number) are generated in the resonator device, whereby one circulating light pulse is superimposed with input light pulses that are spaced n light pulses apart.

6. Method according to claim 1 in which the input light pulses and the circulating light pulse are matched in phase in that the wavelength of the input light pulses or the resonator length of the resonator device is set by a control signal dependent on the effectiveness of coupling input light pulses into the resonator device.

7. Method according to claim 6 in which the input light pulses are RF modulated and the control signal is derived from the signal of a detector detected in turn by a phase-sensitive detector and corresponding to the fraction of input light pulses reflected from an input coupling mirror of the resonator device.

8. Resonator device for light pulse amplification consisting of:
   at least two resonator mirrors forming a light path with a preset optical resonator length, whereby the first resonator mirror forms an input coupling mirror for phase-coherent input light pulses and the light path is free of amplification media, and
   a modulator element for coupling at least one output light pulse out of the light path, whereby each output light pulse represents a linear superposition of a plurality of input light pulses.

9. Resonator device according to claim 8 in which the input light pulses form a pulse train with constant pulse spacing in time, whereby the optical resonator length corresponds to the product of pulse spacing and velocity of light of integral multiples or parts of it.

10. Resonator device according to claim 8 in which the modulator element is an acousto-optical modulator.

11. Resonator device according to claim 8 in which a detector device is provided to detect the energy of a circulating light pulse.

12. Resonator device according to claim 11 in which a controlling device is provided that issues a switching signal to the modulator element after the detector device has determined a preset minimum level of energy of the circulating light pulse, a predetermined number of input pulses has been coupled into the resonator or an external signal has been received.

13. Resonator device according to claim 8 in which at least one resonator mirror is provided with an adjusting device for altering the resonator length.

14. Resonator device according to claim 8 in which a device for dispersion compensation is provided.

15. Resonator device according to claim 8 in which a device for wavelength stabilization is provided that comprises a modulator device for modulation of the input light pulses, a detector device for detection of the fraction of input light pulses not coupled into the resonator device, a modulator source and a phase detector for phase-sensitive detection of the signal of the detector device and for generation of a control signal for wavelength stabilization.

* * * * *